Figure 1:
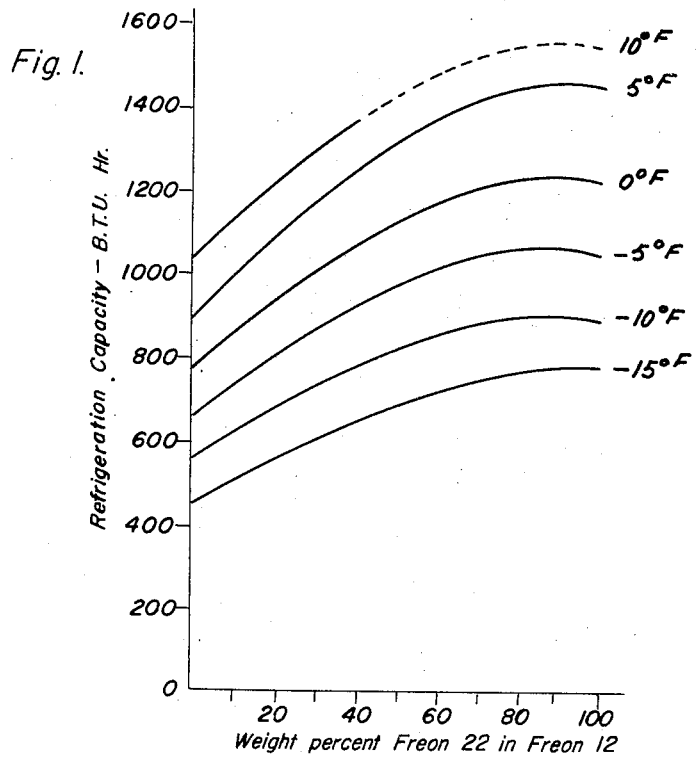

Sept. 6, 1960 T. L. ETHERINGTON ET AL 2,951,350
VARIABLE CAPACITY REFRIGERATION
Filed June 23, 1958

Inventors:
Theodore L. Etherington;
Peter Cannon,
by Joseph T. Cohen
Their Attorney.

United States Patent Office 2,951,350
Patented Sept. 6, 1960

2,951,350

VARIABLE CAPACITY REFRIGERATION

Theodore L. Etherington, Burnt Hills, and Peter Cannon, Scotia, N.Y., assignors to General Electric Company, a corporation of New York Filed June 23, 1958, Ser. No. 743,602

9 Claims. (Cl. 62—149)

This invention relates to a variable capacity refrigeration system and, more particularly, to a variable capacity refrigeration system employing a plurality of refrigerants with specific means to vary the composition of the refrigerant mixture to thereby vary the refrigeration capacity.

Variable capacity refrigeration has increased application not only in commercial heat exchange equipment, but also in the domestic field including refrigeration, heat pumps, air conditioners and the like apparatus. Previous types of variable capacity refrigeration systems generally employed a pair of circulating refrigerants with means of separating the refrigerants or varying the composition, the means including such devices as distilling apparatus, mechanical separating devices, or the use of mutually insoluble refrigerants. These devices further produced not only economic problems but also structural problems to limit their widespread use.

Most modern refrigeration systems employ Freon gases as refrigerants, the term "Freon" being attributed to the E. I. du Pont de Nemours Company as describing that group of halogenated hydrocarbons containing one or more fluorine and/or chlorine atoms. Of the Freons, dichlorodifluoromethane and monochlorodifluoromethane, Freon-12 and Freon-22, or $CCl_2F_2$ and $CHClF_2$, respectively, are quite desirable for refrigeration systems, since mixtures thereof show excellent refrigeration capacities, and variations in the mixtures of these Freons, in turn, provide definite capacity variations. However, mixtures of Freon-12 and Freon-22 have proved to be quite difficult to vary by adsorption of one of the gases from the other, and their particular characteristics are close enough in some respects so that one is often found as an impurity in the other.

Particular materials for adsorption and desorption of gases and liquids are well known in the art, for example, highly porous silica gel, activated charcoal, and salt solutions. However, these materials are not effective for adsorption or desorption of the Freon gases which are in predominant use for refrigerants. In the copending applications, Serial No. 743,601, Cannon, and Serial No. 743,532, Etherington, both applications being assigned to the same assignee as the present invention and filed concurrently herewith, there has been disclosed, material separators otherwise known as molecular sieves, which have excellent adsorbing and desorbing characteristics to the Freon gases, and particularly to Freon-12 and Freon-22. The molecular sieve is a synthetic form of crystalline zeolite having the general formula $$Na_{12}[(AlO_2)_{12}(SiO_2)_{12}] \cdot 27H_2O$$

a more complete description of which may be found in the Journal of the American Chemical Society, vol. 78, No. 23, December 8, 1956, pages 5963–5977. The aforementioned Etherington docket discloses such a molecular sieve wherein the sodium ions have been replaced by calcium ions to provide a material represented by the formula $Ca_6[(AlO_2)_{12}(SiO_2)_{12}] \cdot 27H_2O$ from which the water has been removed. The material is employed as an effective separating means for mixtures of Freon-12 and Freon-22, in an exemplary refrigeration system. An improved form of the molecular sieve is disclosed and taught in the aforementioned Cannon application wherein the molecular sieve is modified by being substantially saturated with preadsorbed Freon-12. The Cannon modified sieve displays an improved capacity for selective adsorption, with no discernible deterioration of the sieve material. Reference is made to both applications where there is found a more complete description of the material and the method of modification, the modified material not being a part of the present invention as such.

Accordingly, it is an object of this invention to provide an improved variable capacity refrigeration system utilizing Freon gases as refrigerants therein.

It is another object of this invention to provide an improved variable capacity refrigeration system utilizing Freon-12 and Freon-22 as the refrigerant therein.

It is another object of this invention to provide a modified molecular sieve as the adsorption desorption material in a Freon-12 and Freon-22 refrigeration system.

It is a further object of this invention to provide a pressure sensitive refrigeration system utilizing Freon-12 and Freon-22 mixture in conjunction with a modified molecular sieve having preadsorbed Freon-12 thereon.

Referring now to Fig. 1, there is illustrated a group of curves indicating the particular desirable capacities of mixtures of Freon-12 and Freon-22. For example, it may be seen that a 100 percent Freon-12 refrigerant at 5° F. represent slightly more than 900 B.t.u. per hour capacity, while if the mixture were changed to a 50 percent Freon-12 and Freon-22 mixture, by weight, the capacity of the same apparatus would be approximately 1300 B.t.u. per hour at 5° F. In a refrigeration system, assuming for example, a 10 percent Freon-22 90 percent Freon-12 mixture, by weight, is employed to maintain a temperature of 5° F., the mixture represents a capacity of 1000 B.t.u per hour, but in order to maintain the 5° F. when the capacity requirement rises, for example, to 1200 B.t.u. per hour, Freon-22 is removed until the composition of the circulating refrigerant becomes 35 percent Freon-22 and the capacity at 5° F. is 1200 B.t.u. per hour. It may be, therefore, understood from Fig. 1 that a refrigeration, heat pump, or air conditioning system employing mixtures of Freon-12 and Freon-22 in conjunction with a proven separating material, provide an economical, highly efficient, and practical type of variable capacity refrigeration system.

Figure 2:
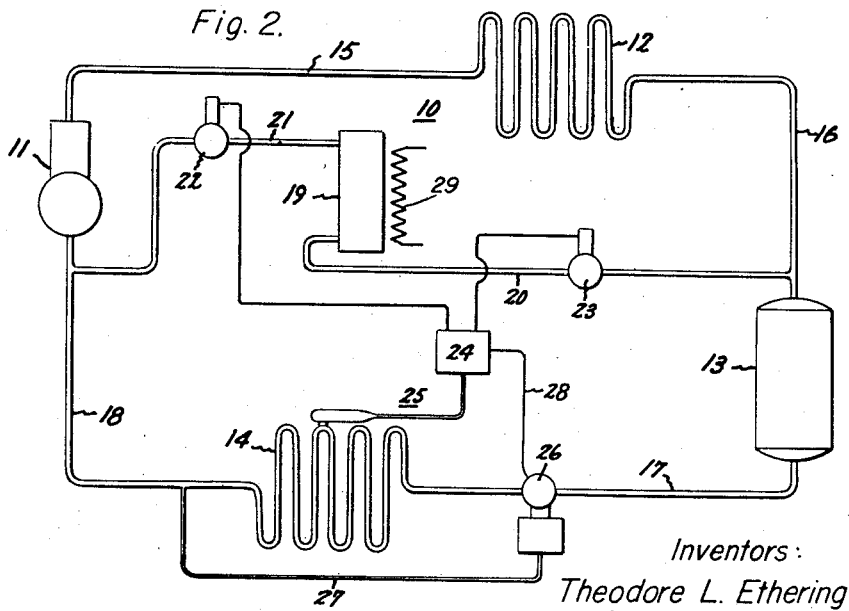

Referring now to Fig. 2, there is illustrated a schematic representation of a refrigeration system 10 for an air conditioner, heat pump or the like, and employing the modified molecular sieve in accordance with this invention. In Fig. 2 there is included the well known components of a refrigeration system including a compressor 11, condenser 12, receiver 13, and evaporator 14, all of which are circuitously connected by suitable conduits 15, 16, 17 and 18 in fluid flow relationship. One location or positioning of the modified molecular sieve of this invention is within a suitable container 19 which may be, in turn, positioned in a building or enclosure or it may be selectively exposed to the external and internal temperature conditions. Container 19 is connected by means of conduit 20 to a point in conduit 16 between the condenser 12 and the receiver 13, and by conduit 21, to a point in conduit 18 between the evaporator 14 and the compressor 11. The particular control of the in-flow and out-flow of the refrigerant mixture in container 19 is provided by means of suitable metering devices or valves 22 and 23. Operation of these valves may be initiated by temperature or pressure sensitive means, and the valves themselves may be actuated manually, electrically, as by a solenoid, or by hydraulic mechanical means, the particular valve type being of no great import in this invention. In one form of this invention, valves 22 and 23 are dependent for their initiation upon pressure sensitive means included within a general control means 24. Such means are illustrated as any well known pressure-temperature connection 25 transmitting pressure and temperature to control 24 by being connected to evaporator 14.

A valve 26 is positioned between receiver 13 and evaporator 14 to regulate the flow of the refrigerant mixture from the receiver 13 to the evaporator 14. Valve 26 is also responsive to pressure on the low pressure side of the system and may be suitably integrated into control 24, illustrated by lead 28, where the sensitivity thereof may be adjusted by the operator of the system. Valve 26 may be in the form of a capillary tube or an expansion valve, pressure or temperature operated. In the preferred form of this invention, valve 26 is an expansion type valve which senses pressure in line 18 by means of a suitable conduit 27 which transmits pressure to a diaphragm or the like assembly to regulate pressure in the evaporator. Valve 26 is, therefore, a constant pressure valve.

Container 19 contains the modified molecular sieve with Freon-12 preadsorbed therein. The quantity of the modified molecular sieve necessary is easily derived from the size of the system together with the adsorption capacity of the modified sieve which has been heretofore given in the Cannon application as 7 pounds per cubic foot or that 1 cubic foot of the modified sieve will adsorb 7 pounds of Freon-22.

The operation of this refrigeration system is readily described by assuming that the molecular sieve has been exposed to the refrigerant mixture and contains an amount of Freon-22 and the mixture is rich in Freon-12. With valves 22 and 23 closed, a refrigerant mixture flows through the system and through the evaporator 14, being maintained therein at a constant pressure by valve 26. When the temperature of the evaporator is reduced and the capacity limitation of the circulating mixture is being approached, the efficiency is also being lowered, and the pressure on the low pressure side of the evaporator is also reduced. At a predetermined value of low pressure as sensed by pressure line 27, lead 28 to control 24, valve 22 is opened and Freon-22 is released from container 19. This release as described in the aforementioned Cannon application is readily obtained by reduced pressures where the container 19 is already under pressure equal to the high pressure side of the system and opening of valve 22 serves to reduce the pressure. On the other hand, the compressor serves to evacuate the container 19. The adsorption description process is reversible over a relatively short period of time. Raising the temperature of the container 19 serves to facilitate removal of Freon-22 and for this purpose, container 19 may be suitably positioned or alternately exposed to the various temperature ranges associated with the external temperature and internal temperatures of a building or enclosure, or the temperatures of the operating components of the system. Alternately, where these arrangements may be undesirable, a heater may be provided for container 19. In Fig. 2 there is disclosed an electrical heater element 29 which may be internal or external with relation to container 19 and energized through control 24. After a suitable quantity of Freon-22 has been removed from container 19, valve 22 is closed and valve 26 operates to maintain the pressure in the system for the different mixture.

When the capacity of the refrigerant mixture greatly exceeds that necessary to maintain a desired temperature, valve 23 is opened and a portion of the refrigerant mixture is pumped into container 19 in order that the molecular sieve therein may adsorb Freon-22. Pressure temperature sensing device 25 also indicates the temperature conditions of the evaporator and may be integrated into control 24 to be correlated with the valve controls.

Other systems, arrangements, and controls are easily surmised by those skilled in the art. Control 24 is understood as being any of the well known panel controls for refrigerators, stoves and the like and represents a central station control whereby the operation of the components of the system may be initiated by the operator, or where pressure and temperature signals may be integrated to provide a single signal.

Valves 22 and 23 may, in some applications, be manually operated, for example, in large air conditioning systems where additional and large loads are alternately placed in and taken from the system. In such an application, where a load is placed in the system, the operator merely operates valve 22 to release Freon-22 according to the temperature signal of the device 25 and then closes the valve. Where a load is taken from the system, the operator opens valve 23 for adsorption of Freon-22 until a satisfactory mixture is provided to maintain the required temperature and valve 23 is then closed.

While various operating systems may be employed, in particular, it may be seen that this invention provides a chemically modified molecular sieve having specific selective adsorption properties, in an exemplary refrigeration system application to be specifically selective towards a mixture of Freon-12 and Freon-22 gases.

While other modifications and uses of this invention and variations of apparatus within the scope of the invention have not been described, the invention is intended to include all such as may be embraced within the following claims.

What we claim as new and desire to secure by Letters Patent of the United States is:

1. A variable capacity refrigeration system, a plurality of refrigerants flowing through said system, a sorption vessel in said system, said sorption vessel containing a modified molecular sieve adsorber said sieve modified by having preadsorbed $CCl_2F_2$ thereon, and means to admit the flow of refrigerant mixture into said vessel for said adsorber to selectively adsorb and desorb one of said refrigerants from and into the system.

2. The invention as claimed in claim 4 wherein said plurality of refrigerants include a pair of Freons.

3. The invention as claimed in claim 2 wherein said pair of refrigerants are $CCl_2F_2$ and $CHClF_2$.

4. The invention as claimed in claim 1 wherein said modified molecular sieve is represented by the formula $Ca_6[(AlO_2)_{12}(SiO_2)_{12}]$, together with $CCl_2F_2$ preadsorbed thereon.

5. A variable capacity refrigeration system comprising in combination, a compressor, condenser, and an evaporator connected in circuitous flow relationship, a storage vessel, a mixture of $CCl_2F_2$ and $CHClF_2$ in said storage vessel, a sorption vessel in said system, said sorption vessel containing a synthetic crystalline zeolite molecular sieve represented by the formula $Ca_6[(AlO_2)_{12}(SiO_2)_{12}]$, said sieve containing $CCl_2F_2$ to the saturation point thereof, means to circulate the mixture of refrigerants through the system, and means to admit the flow of refrigerant mixture in said system into said sorption vessel for the modified molecular sieve therein to selectively adsorb one of said refrigerants.

6. A variable capacity refrigeration system comprising in combination, a compressor, a condenser, and an evaporator connected in circuitous fluid flow relationship, a pair of refrigerants circulating in said system, said refrigerants being $CCl_2F_2$ and $CHClF_2$, a sorption vessel in said system, said sorption vessel containing a molecular sieve represented by the formula

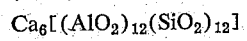

said sieve containing preadsorbed $CCl_2F_2$ thereon, means to circulate the mixture through said system, and pressure sensitive means responsive to pressure in said system to admit the flow of refrigerant mixture into the sorption vessel for the molecular sieve therein to selectively adsorb one of said refrigerants to the exclusion of the other.

7. A variable capacity refrigeration system comprising in combination, a compressor, a condenser, a storage vessel, and an evaporator connected in circuitous fluid flow relationship, a mixture of $CCl_2F_2$ and $CHClF_2$ in said storage vessel, means to circulate the mixture through said system, and a sorption vessel connected in said system, the inlet of said sorption vessel being connected at a point after the condenser and before the evaporator, and the outlet of said vessel after the evaporator and before the compressor, said sorption vessel containing a modified molecular sieve represented by the formula $Ca_6[(AlO_2)_{12}(SiO_2)_{12}]$, said sieve modified by being saturated with $CCl_2F_2$, valve means to introduce a portion of the circulating mixture into the sorption vessel by means of the compressor, and valve means controlling the flow from the sorption vessel to the vacuum side of the compressor to provide selective adsorption of one of said refrigerants to the exclusion of the other by said molecular sieve.

8. A variable capacity refrigeration system comprising in combination, a compressor, a condenser, and an evaporator connected in circuitous fluid flow relationship, a plurality of refrigerants flowing through said system one of which is a Freon, an adsorption vessel in said system, said adsorption vessel containing a modified molecular sieve adsorber, said sieve being modified by having preadsorbed $CCl_2F_2$ thereon, and means to admit flow of refrigerants into said vessel for the said adsorber to selectively adsorb and desorb said Freon from and into the system.

9. The invention as recited in claim 8 wherein said Freon is $CCl_2F_2$.

References Cited in the file of this patent
UNITED STATES PATENTS

| | | |
|---|---|---|
| 2,359,595 | Urban | Oct. 3, 1944 |
| 2,430,692 | Touborg | Nov. 11, 1947 |
| 2,577,834 | Wenk | Dec. 11, 1951 |

OTHER REFERENCES

Breck et al.: Journal of American Chemical Society, Dec. 8, 1956, volume 28, Number 23.

Barrier: Journal of the Society of Chemical Industry, May 1945, volume 64, pages 130–135.